United States Patent
Lauwers et al.

(10) Patent No.: US 10,292,331 B2
(45) Date of Patent: May 21, 2019

(54) DRAPER BELT SYSTEM WITH FRAME PIVOT JOINT AND ROLLER SHARING SAME AXIS

(71) Applicant: CNH Industrial America LLC, New Holland, PA (US)

(72) Inventors: Andrew V. Lauwers, Sandusky, OH (US); Blaine R. Noll, Fleetwood, PA (US); Joshua S. Joyce, Lititz, PA (US); Kyle R. Schropp, Mount Joy, PA (US); John J. Conroy, Ephrata, PA (US); Zachary Long, Harleysville, PA (US); Craig D. Roberts, Denver, PA (US); James F. Rayfield, New Holland, PA (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 15/639,376

(22) Filed: Jun. 30, 2017

(65) Prior Publication Data

US 2019/0000015 A1  Jan. 3, 2019

(51) Int. Cl.
*A01D 61/02* (2006.01)
*A01D 61/00* (2006.01)

(52) U.S. Cl.
CPC ........... *A01D 61/02* (2013.01); *A01D 61/002* (2013.01)

(58) Field of Classification Search
CPC ...... A01D 41/14; A01D 57/20; A01D 61/002; A01D 45/021; A01D 34/30; A01D 41/144; A01D 43/06; A01D 34/283; A01D 61/02

USPC .......................................................... 56/181
See application file for complete search history.

(56) References Cited

U.S. PATENT DOCUMENTS

| | | | |
|---|---|---|---|
| 1,782,261 A | 11/1930 | Friis-Hansen | |
| 5,231,826 A * | 8/1993 | Jennings | A01D 82/00 56/10.9 |
| 7,614,206 B2 | 11/2009 | Tippery et al. | |
| 7,766,158 B2 | 8/2010 | Laganiere | |
| 7,802,417 B2 * | 9/2010 | Sauerwein | A01D 41/14 56/181 |
| 8,087,224 B1 | 1/2012 | Coers et al. | |

(Continued)

FOREIGN PATENT DOCUMENTS

AU  2011223985 A1  4/2012

OTHER PUBLICATIONS

European Search Report for European Patent Application No. 18171515.2 dated Nov. 16, 2018 (5 pages).

*Primary Examiner* — Arpad Fabian-Kovacs
(74) *Attorney, Agent, or Firm* — Peter K. Zacharias; Patrick M. Sheldrake (57) ABSTRACT

A draper belt system is provided that includes a first draper frame pivotally coupled to a second draper frame at a pivot joint. The pivot joint includes a central longitudinal axis about which rotation at the pivot joint occurs. The draper belt system includes a draper belt assembly including a first roller rotatably coupled to the first draper frame, a second roller rotatably coupled to the second draper frame, and a third roller rotatably coupled between the first and second draper frames. The third roller includes a central longitudinal axis about which the third roller rotates. The central longitudinal axis of the third roller is the same as the central longitudinal axis of the pivot joint.

20 Claims, 11 Drawing Sheets

(56) References Cited

U.S. PATENT DOCUMENTS

| | | | | |
|---|---|---|---|---|
| 8,281,561 | B2* | 10/2012 | Dow | A01D 57/20 |
| | | | | 56/181 |
| 8,495,855 | B1* | 7/2013 | Conrad | A01D 61/002 |
| | | | | 56/16.4 R |
| 9,402,343 | B1* | 8/2016 | Allochis | A01D 34/283 |
| 9,526,210 | B2* | 12/2016 | Schulze Selting | A01D 41/12 |
| 9,622,409 | B2* | 4/2017 | Coers | A01D 41/14 |
| 2007/0251202 | A1* | 11/2007 | Coers | A01D 57/20 |
| | | | | 56/181 |
| 2008/0295473 | A1* | 12/2008 | Tippery | A01D 41/144 |
| | | | | 56/14.5 |
| 2009/0320431 | A1* | 12/2009 | Puryk | A01D 41/14 |
| | | | | 56/181 |
| 2011/0099964 | A1* | 5/2011 | Coers | A01D 41/14 |
| | | | | 56/296 |
| 2011/0113741 | A1 | 5/2011 | Coers et al. | |
| 2013/0105282 | A1* | 5/2013 | Hoffman | A01D 41/14 |
| | | | | 198/814 |
| 2014/0075906 | A1 | 3/2014 | Heim et al. | |
| 2015/0059307 | A1* | 3/2015 | Ritter | A01D 75/182 |
| | | | | 56/6 |

* cited by examiner

DRAPER BELT SYSTEM WITH FRAME PIVOT JOINT AND ROLLER SHARING SAME AXIS

BACKGROUND

Harvesters are used in the agricultural industry to harvest a variety of crops. Headers for harvesters generally use belts on rollers to move the harvested crops from lateral areas of the header to a central area for processing. As demand for larger harvesters with increased capacity increases, the harvester must either drive the belts faster or the headers must be wider to accommodate more crop. There are many challenges associated with driving the belt faster, including the increased wear of parts, power costs, and maintenance costs.

In order to make a header wider while still adhering to changes in terrain, the header must be flexible. Generally, such flexibility is accomplished by the use of two or more belt and roller assemblies, and a pivot joint of the draper frame between the two assemblies. The pivot joint is generally positioned between the two belt and roller assemblies, resulting in a gap between the rollers through which crop can be lost during harvesting.

Figure 1:
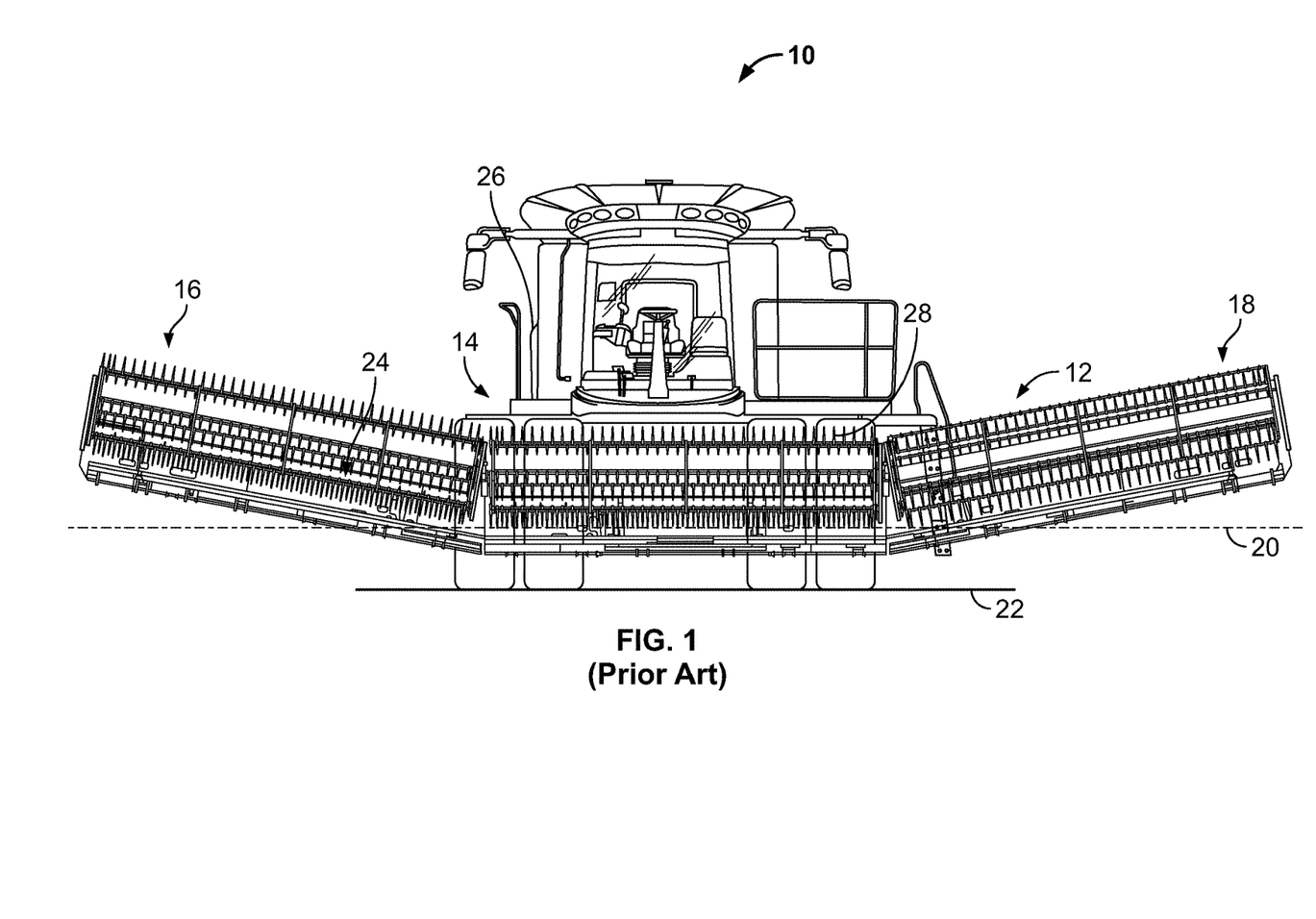
FIG. 1 is a front view of a traditional harvester including a header.

For example, FIG. 1 shows a front view of a traditional harvester 10. The harvester 10 includes a header 12, such as the one described in U.S. Pat. No. 8,087,224 ("the '224 patent"). The header 12 can include a central section 14 with right and left wings 16, 18 capable of pivoting relative to the central section 14 to accommodate uneven terrain while providing the wide header 12 for greater crop capacity. A lateral plane 20 extends through the header 12 and can generally be substantially parallel to the ground 22 during normal use. The header 12 includes a draper belt system 24 disposed in the central section 14 and the right and left wings 16, 18 to assist in guiding crop from the header 12 into a processing system 26 within the harvester 10. The central section 14 and the right and left wings 16, 18 can include reels 28.

Figure 2:
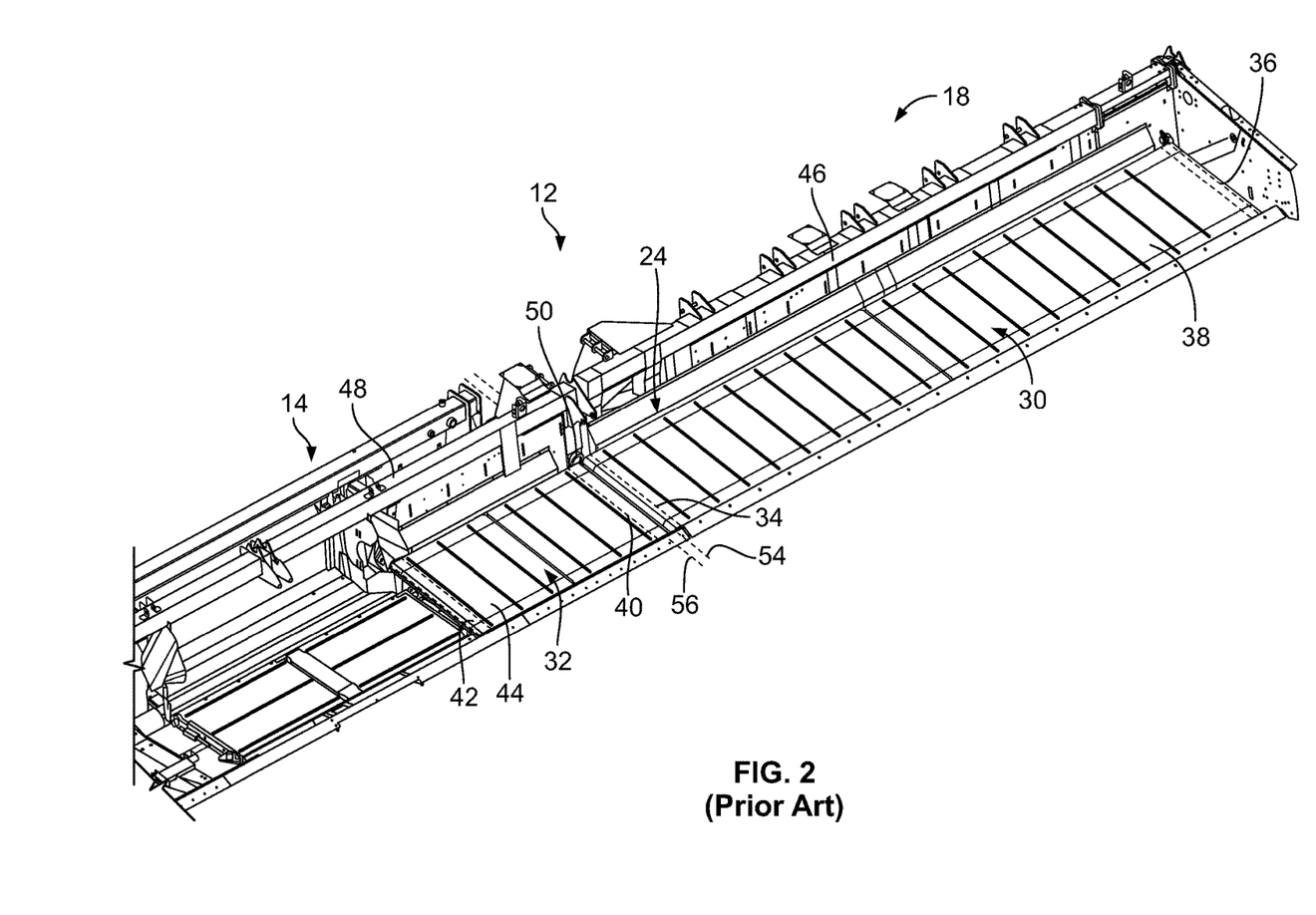
FIG. 2 is a perspective, partial view of a traditional harvester header.
Figure 3:
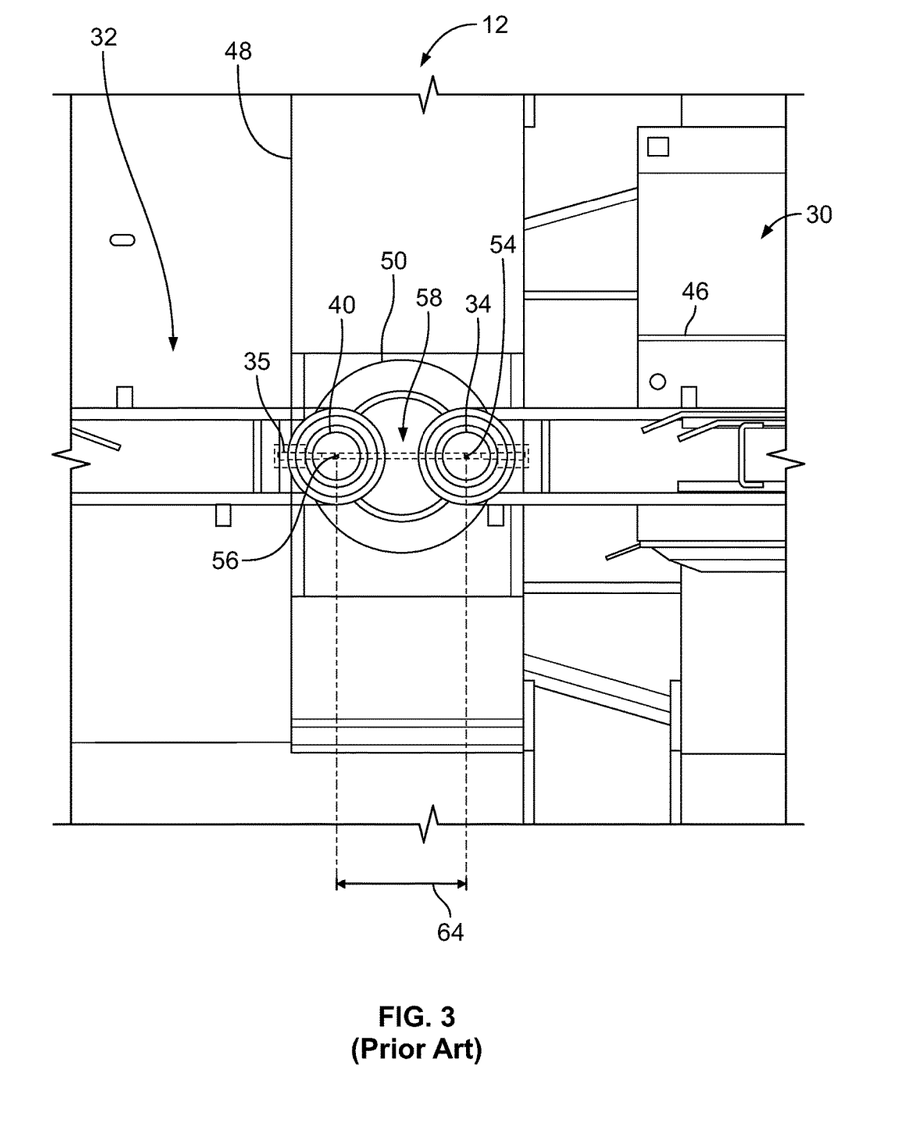
FIG. 3 is a detailed front view of a traditional harvester header.

FIGS. 2 and 3 show perspective and detailed views of the header 12. Although discussed with respect to the left wing 18, it should be understood that the right wing 16 has a similar structure and function. The header 12 includes a draper belt system 24 for transferring harvested crop from the left wing 18 to the central section 14 such that the central section 14 can introduce the crop into the processing system 26. The draper belt system 24 includes a first draper belt assembly 30 at the left wing 18 and a second draper belt assembly 32 at the central section 14 disposed adjacent to the first draper belt assembly 30.

The first draper belt assembly 30 includes a first roller 34, a second roller 36, and a belt 38 looped around the first and second rollers 34, 36. The second draper belt assembly 32 includes a third roller 40, a fourth roller 42, and a belt 44 looped around the third and fourth rollers 40, 42. As the belt 38 is rotated in a counterclockwise direction, crop collected on the belt 38 is transferred from the left wing 18 to the belt 44 of the central section 14. The header 12 includes a draper frame 46 associated with the left wing 18 and a draper frame 48 associated with the central section 14. The draper frames 46, 48 connect at a pivot joint 50 such that the left wing 18 can rotate relative to the central section 14.

The first roller 34 and the third roller 40 each have their own central longitudinal axis 54, 56 about which the respective first roller 34 and third roller 40 rotate. As shown in the detailed view of FIG. 3, due to the separate belt assemblies 30, 32, the first and third rollers 34, 40 are separated by a gap 58 to allow for rotation of the draper frame 46 relative to the draper frame 48 without interference between the belts 38, 44. The gap 58 results in the axes 54, 56 being separated by a distance 64, which the '224 patent describes is constant. Although not clear or described in the '224 patent, it appears that the distance 64 is kept constant by a frame 35 surrounding the rollers 34, 40, which locks the spacing between the axes 54, 56. Such a frame 35 can be difficult to construct, can require additional maintenance of parts, increases the cost of production, and can increase the time necessary for replacement of parts.

Due to the gap 58 and the separation between the rollers 34, 40, a portion of the harvested crop can be lost during transfer of the drop from the left wing 18 to the central section 14. A similar loss in crop occurs during transfer of the crop from the right wing 16 to the central section 14.

SUMMARY

Exemplary embodiments are directed to a draper belt system for a harvester header including a draper belt assembly having a roller sharing the rotational axis with the pivot joint for the draper frames pivotally coupled together. One draper frame (e.g., the wing frame) pivots relative to the other draper frame (e.g., the central frame), and a single draper belt extends over at least a portion of the wing frame, a portion of the central frame, and the roller between the frames. This configuration advantageously takes away the gap normally between two separate draper belts on either side of the pivot joint of the draper frame, significantly reducing the potential for lost crop.

In accordance with embodiments of the present disclosure, an exemplary draper belt system is provided. The draper belt system includes a first draper frame pivotally coupled to a second draper frame at a pivot joint. The pivot joint includes a central longitudinal axis about which rotation at the pivot joint occurs. The draper belt system includes a draper belt assembly comprising a first roller rotatably coupled to the first draper frame, a second roller rotatably coupled to the second draper frame, and a third roller rotatably coupled between the first and second draper frames. The third roller includes a central longitudinal axis about which the third roller rotates. The central longitudinal axis of the third roller is the same as the central longitudinal axis of the pivot joint.

The draper belt system includes a single draper belt looped around the first, second and third rollers. The draper belt extends between the first and second rollers without a gap in the draper belt at the pivot joint. The central longitudinal axis of the third roller and the central longitudinal axis of the pivot joint are substantially aligned along a plane extending through the central longitudinal axes and parallel or substantially parallel to horizontal. The central longitudinal axis of the third roller and the central longitudinal axis of the pivot joint are also substantially aligned along a plane extending through the central longitudinal axes and perpendicular or substantially perpendicular to horizontal.

The first draper frame includes a first end and an opposing second end. The first roller can be rotatably coupled at or near the first end of the first draper frame. The second draper frame includes a first end and an opposing second end. The second roller can be rotatably coupled at or near the first end of the second draper frame. The third roller can be rotatably coupled between the second ends of the first and second draper frames.

In accordance with embodiments of the present disclosure, an exemplary harvester header is provided. The harvester header includes a central draper frame and a wing draper frame pivotally coupled to the central draper frame at a pivot joint. The pivot joint includes a central longitudinal axis about which rotation at the pivot joint occurs. The harvester header includes a draper belt assembly including a first roller rotatably coupled to the central draper frame, a second roller rotatably coupled to the wing draper frame, and a third roller rotatably coupled between the central and wing draper frames. The draper belt assembly includes a draper belt looped around the first, second and third rollers. The third roller includes a central longitudinal axis about which the third roller rotates. The central longitudinal axis of the third roller is the same as the central longitudinal axis of the pivot joint.

The draper belt extends between the first and second rollers without a gap in the draper belt at the pivot joint. The central longitudinal axis of the third roller and the central longitudinal axis of the pivot joint are substantially aligned along a plane extending through the central longitudinal axes and parallel or substantially parallel to horizontal. The central longitudinal axis of the third roller and the central longitudinal axis of the pivot joint are also substantially aligned along a plane extending through the central longitudinal axes and perpendicular or substantially perpendicular to horizontal.

The first and second draper frames each include a first end and an opposing second end. The first roller can be rotatably coupled at or near the first end of the first draper frame. The second roller can be rotatably coupled at or near the first end of the second draper frame. The third roller can be rotatably coupled between the second ends of the first and second draper frames.

In accordance with embodiments of the present disclosure, an exemplary harvester is provided. The harvester includes a header. The header includes a first draper frame pivotally coupled to a second draper frame at a pivot joint. The pivot joint includes a central longitudinal axis about which rotation at the pivot joint occurs. The header includes a draper belt assembly including a first roller rotatably coupled to the first draper frame, a second roller rotatably coupled to the second draper frame, and a third roller rotatably coupled between the first and second draper frames. The third roller includes a central longitudinal axis about which the third roller rotates. The central longitudinal axis of the third roller is the same as the central longitudinal axis of the pivot joint. In some embodiments, the header can include an auger disposed adjacent or substantially adjacent to the draper belt assembly. The harvester includes a processing system configured to process crop introduced into the processing system from the draper belt assembly.

The draper belt assembly includes a draper belt looped around the first, second and third rollers. The draper belt extends between the first and second rollers without a gap in the draper belt at the pivot joint. The central longitudinal axis of the third roller and the central longitudinal axis of the pivot joint are substantially aligned along a plane extending through the central longitudinal axes and parallel or substantially parallel to horizontal. The central longitudinal axis of the third roller and the central longitudinal axis of the pivot joint are also substantially aligned along a plane extending through the central longitudinal axes and perpendicular or substantially perpendicular to horizontal.

In accordance with embodiments of the present disclosure, an exemplary method of operating a harvester is provided. The method includes pivoting a second draper frame relative to a first draper frame of a header at a pivot joint. The pivot joint includes a central longitudinal axis about which rotation of the pivot joint occurs. The method includes rotating a draper belt of a draper belt assembly of the header. The draper belt assembly includes a first roller rotatably coupled to the first draper frame, a second roller rotatably coupled to the second draper frame, and a third roller rotatably coupled between the first and second draper frames. The draper belt assembly includes a draper belt looped around the first, second and third rollers. The third roller includes a central longitudinal axis about which the third roller rotates. The central longitudinal axis of the third roller is the same as the central longitudinal axis of the pivot joint.

Any combination and/or permutation of embodiments is envisioned. Other objects and features will become apparent from the following detailed description considered in conjunction with the accompanying drawings. It is to be understood, however, that the drawings are designed as an illustration only and not as a definition of the limits of the present disclosure.

BRIEF DESCRIPTION OF THE DRAWINGS

To assist those of skill in the art in making and using the disclosed draper belt systems, reference is made to the accompanying figures, wherein.

DETAILED DESCRIPTION

It should be understood that the relative terminology used herein, such as "front", "rear", "left", "top", "bottom", "vertical", "horizontal", "up" and "down" is solely for the purposes of clarity and designation and is not intended to limit embodiments to a particular position and/or orientation. Accordingly, such relative terminology should not be construed to limit the scope of the present disclosure. In addition, it should be understood that the scope of the present disclosure is not limited to embodiments having specific dimensions. Thus, any dimensions provided herein are merely for an exemplary purpose and are not intended to limit the invention to embodiments having particular dimensions.

The term "belt" as used herein refers to a belt, chain, or other mode of conveying material. The term "horizontal" as used herein refers to a lateral plane of the harvester or harvester header oriented substantially parallel to the terrain on which the harvester travels during normal operation and/or orientation of the harvester.

Figure 4:
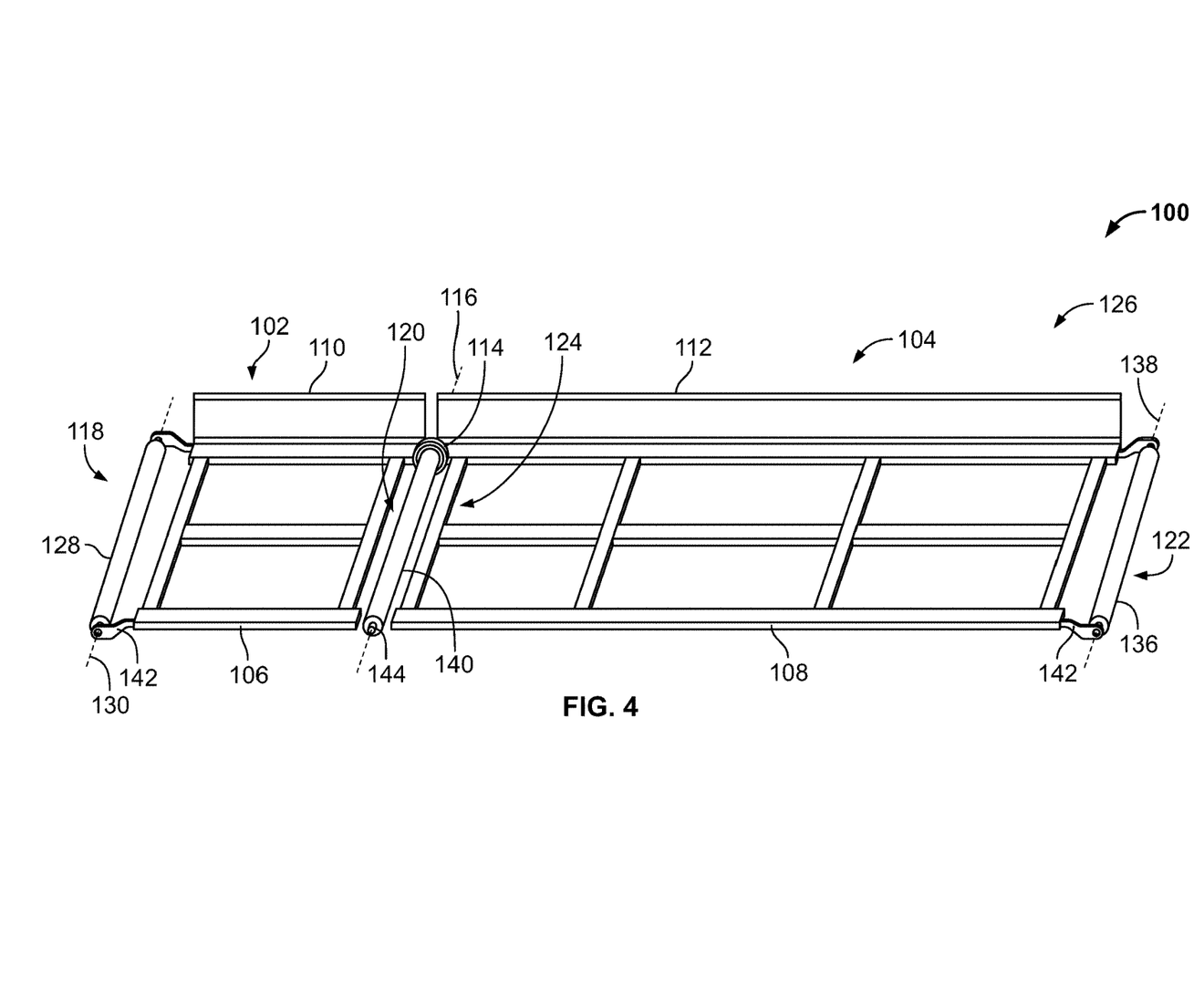
FIG. 4 is a perspective view of an exemplary draper belt system of the present disclosure including a central section and a left wing.
Figure 5:
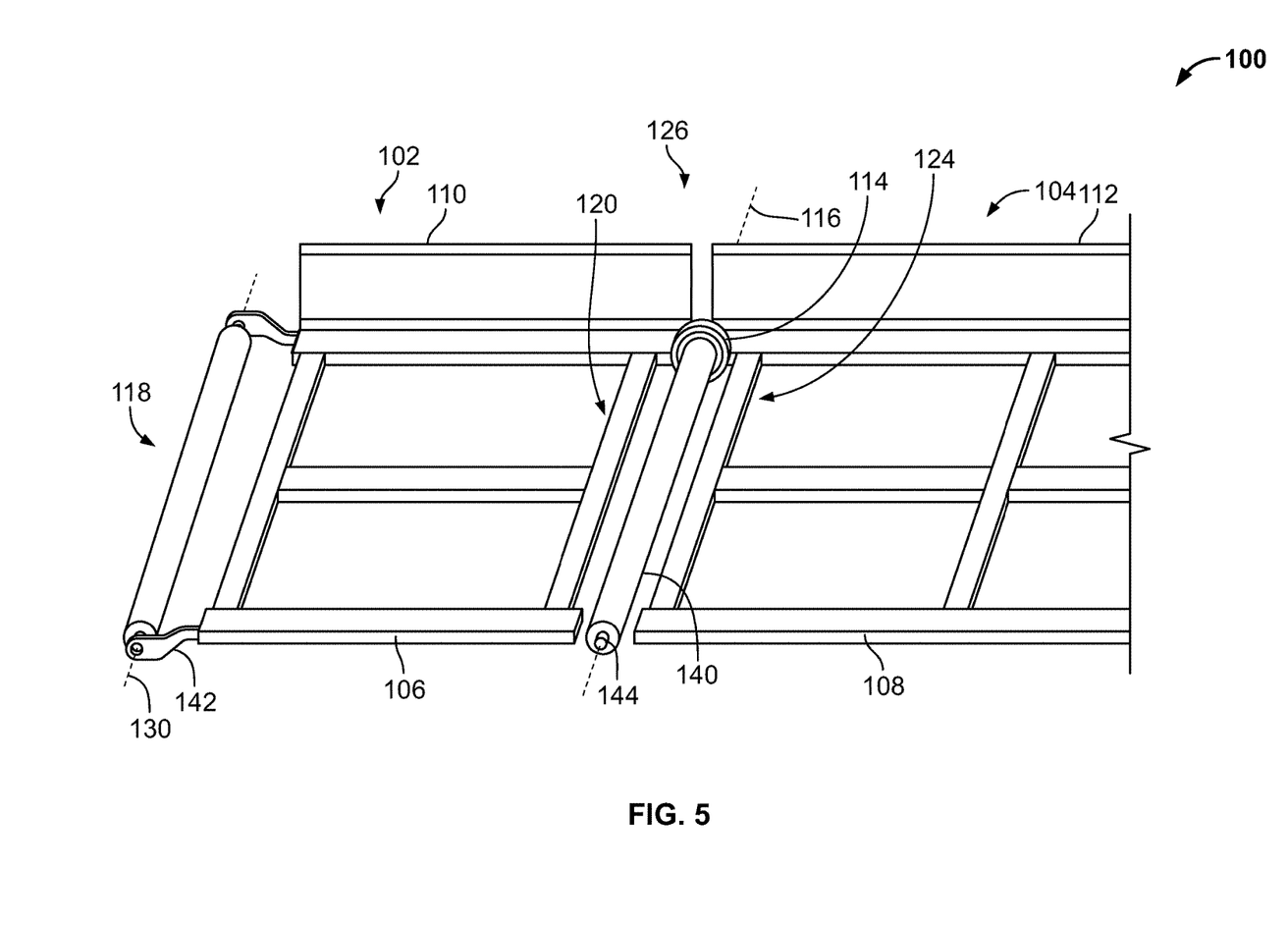
FIG. 5 is a detailed view of an exemplary draper belt system of the present disclosure including a central section and a left wing.

FIGS. 4 and 5 shows perspective and detailed views of an exemplary draper belt system 100 (hereinafter "system 100") for a harvester header, such as harvester header 12 of FIG. 2. The system 100 provides for a flexible frame draper head with a single piece lateral draper frame such that the frame pivots around the same axis as the belt frame. The axis for both the frame hinge and the belt hinge is on the same plane. The frame hinge or pivot pin and the belt frame pin (e.g., roller) are on the same axis. By having a single piece draper frame, the number of drives needed to operate the system 100 and the potential for loss in harvested crop is reduced. The header frame can therefore pivot about an axis by an amount that would be determined by the ground features that need to be followed. The belt frame can substantially simultaneously pivot about an axis determined by the relationship of the belt frame with the header frame.

Still with reference to FIGS. 4 and 5, the system 100 includes a first draper frame 102 (e.g., a central section frame) and a second draper frame 104 (e.g., a left wing frame). Although illustrating only a left wing frame, it should be understood that a substantially similar system 100 can be incorporated on the right side of the harvester header. The draper frame 102 includes frame members 106 that extend along a plane substantially aligned with horizontal. The draper frame 104 also includes frame members 108 that extend along the same plane when the draper frame 104 is in a non-pivoted position. The draper frames 102, 104 can each include a back plate 110, 112 mounted to the rear side of the respective draper frames 102, 104.

The draper frames 102, 104 are pivotally coupled at a pivot joint 114 (e.g., a hinge) such that the draper frame 104 can pivot relative to the draper frame 102 and relative to horizontal. Such pivoting allows the system 100 to follow changes in terrain during harvesting, resulting in efficient harvesting. Although illustrated as connecting the draper frames 102, 104 at the rear of the assembly, in some embodiments, the pivot joint 114 can be at any point between the draper frames 102, 104. The pivot joint 114 includes a central longitudinal axis 116 extending from the rear to the front of the system 100 and passing through the center of the pivot joint 114. The central longitudinal axis 116 defines the axis about which the pivot joint 114 rotates when the draper frame 104 is pivoted relative to the draper frame 102.

The draper frame 102 generally includes a first end 118 (e.g., a proximal end of the system 100) and an opposing second end 120. Similarly, the draper frame 104 generally includes a first end 122 (e.g., a distal end of the system 100) and an opposing second end 124. The system 100 includes a draper belt assembly 126 associated with the draper frames 102, 104. The draper belt assembly 126 includes a first roller 128 rotatably coupled to the draper frame 102 at or near the first end 118 of the draper frame 102. The first roller 128 can rotate about a central longitudinal axis 130. The central longitudinal axis 130 can be substantially parallel to the central longitudinal axis 116 of the pivot joint 114.

Figure 9:
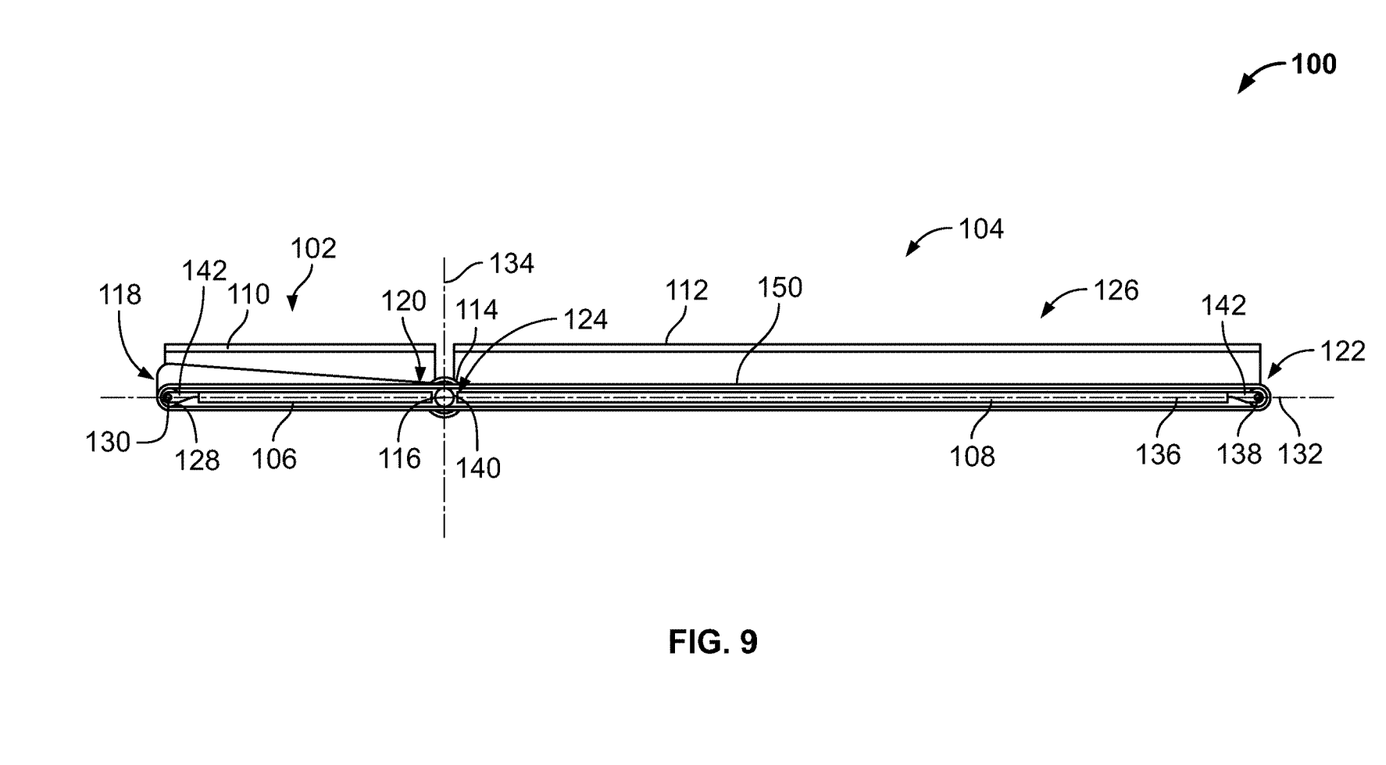
FIG. 9 is a front view of an exemplary draper belt system of the present disclosure including a central section, a left wing, and a draper belt.

In some embodiments, the central longitudinal axis 130 can be in the same horizontal plane 132 (defined by the draper frames 102, 104) extending through the central longitudinal axis 116 (see, e.g., FIG. 9). In some embodiments, the central longitudinal axis 130 can be angled relative to the horizontal plane 132 (e.g., the front end of the first roller 128 can be closer to the horizontal plane 132 than the rear end of the first roller 128). In such embodiment, the central longitudinal axis 130 is not in the plane 132. In some embodiments, the central longitudinal axis 130 can be parallel or aligned with the horizontal plane 132 (e.g., the front and rear ends of the first roller 128 are equally disposed relative to the horizontal plane 132).

The draper belt assembly 126 includes a second roller 136 rotatably coupled to the draper frame 104 at or near the first end 122 of the draper frame 104. The second roller 136 can rotate about a central longitudinal axis 138. The central longitudinal axis 130 can be substantially parallel to the central longitudinal axis 116 of the pivot joint 114, and can be in the horizontal plane 132. The central longitudinal axis 130 can therefore be in the plane 132 defined by the draper frames 102, 104.

The draper belt assembly 126 includes a third roller 140 rotatably coupled between the second ends 120, 124 of the draper frames 102, 104. In some embodiments, the third roller 140 can be coupled to both the draper frames 102, 104. In some embodiments, the third roller 140 can be coupled to only one of the draper frames 102, 104 while remaining disposed between the draper frames 102, 104. In some embodiments, the third roller 140 can be coupled to the pivot joint 114.

The third roller 140 can rotate about the same central longitudinal axis 116 as the pivot joint 114. Particularly, the central longitudinal axis 116 for both the pivot joint 114 and the third roller 140 is in the horizontal plane 132 and in a vertical plane 134 extending perpendicularly to the horizontal plane 132. Thus, the central longitudinal axis 116 is shared by both the pivot joint 114 and the third roller 140. The central longitudinal axis 116 is disposed between the upper and lower runs of the draper belt 150.

The rollers 128, 136, 140 discussed herein generally define a cylindrical, elongated shape. The rollers 128, 136, 140 can be rotatably coupled to the respective draper frames 102, 104 via mounting brackets 142, and can include mounting shafts 144 either extending from opposing ends of the rollers 128, 136, 140 or a single mounting shaft 144 extending through the entire roller 128, 136, 140 and extending from the opposing ends of the roller 128, 136, 140.

Figure 6:
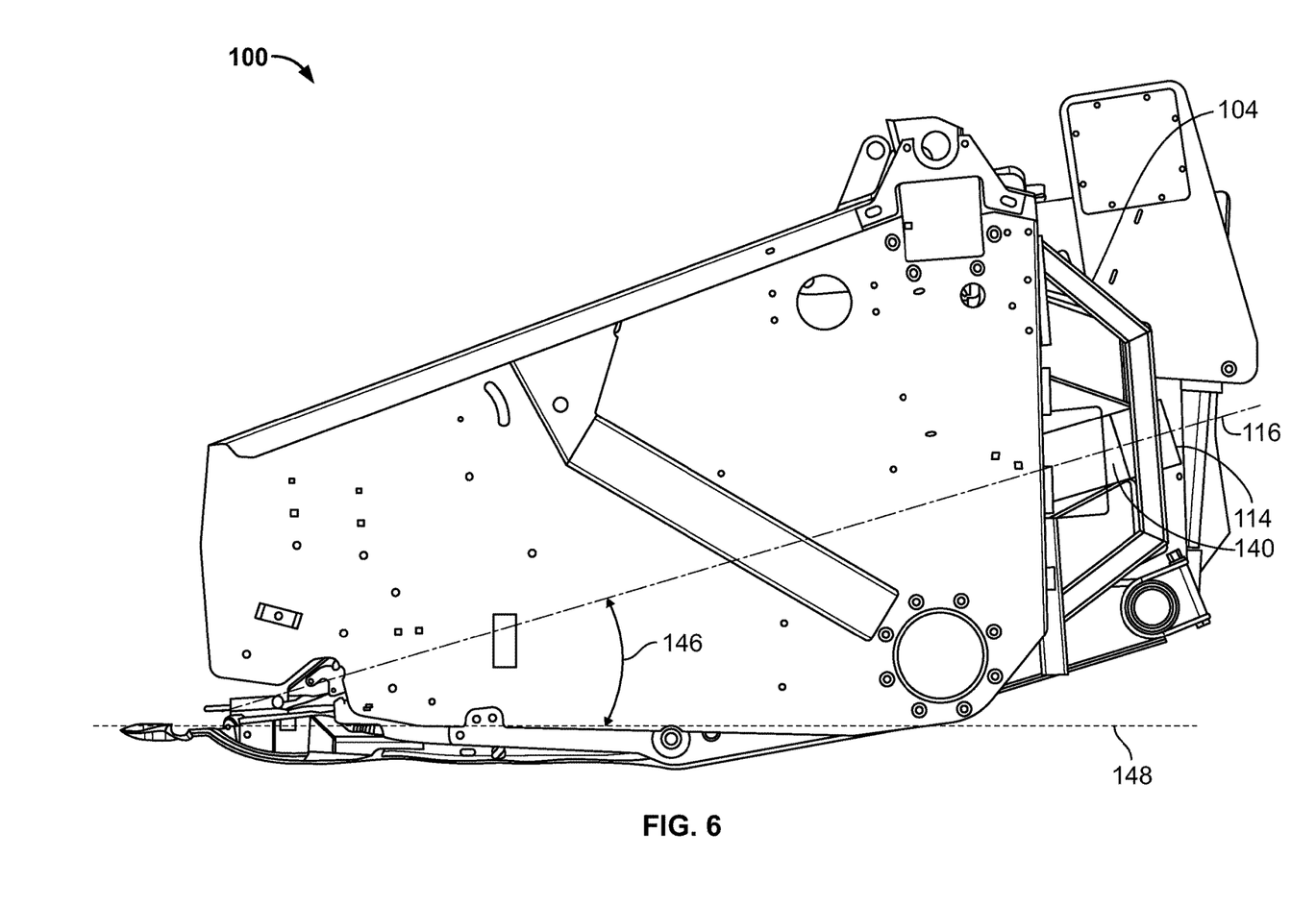
FIG. 6 is a side view of an exemplary draper belt system of the present disclosure.

FIG. 6 is a side view of the system 100. In particular, FIG. 6 shows the draper frame 104 with the pivot joint 114 and third roller 140 aligned along the same central longitudinal axis 116. In some embodiments, the central longitudinal axis 116 (and the entire system 100) can be angled relative to horizontal 148 by an angle 146 such that the front of the system 100 is downwardly sloped to assist in harvesting crop. Particularly, the horizontal plane 132 of the draper frames 102, 104 (extending through the central longitudinal axis 116) can be angled relative to horizontal 148 by the angle 146.

Figure 7:
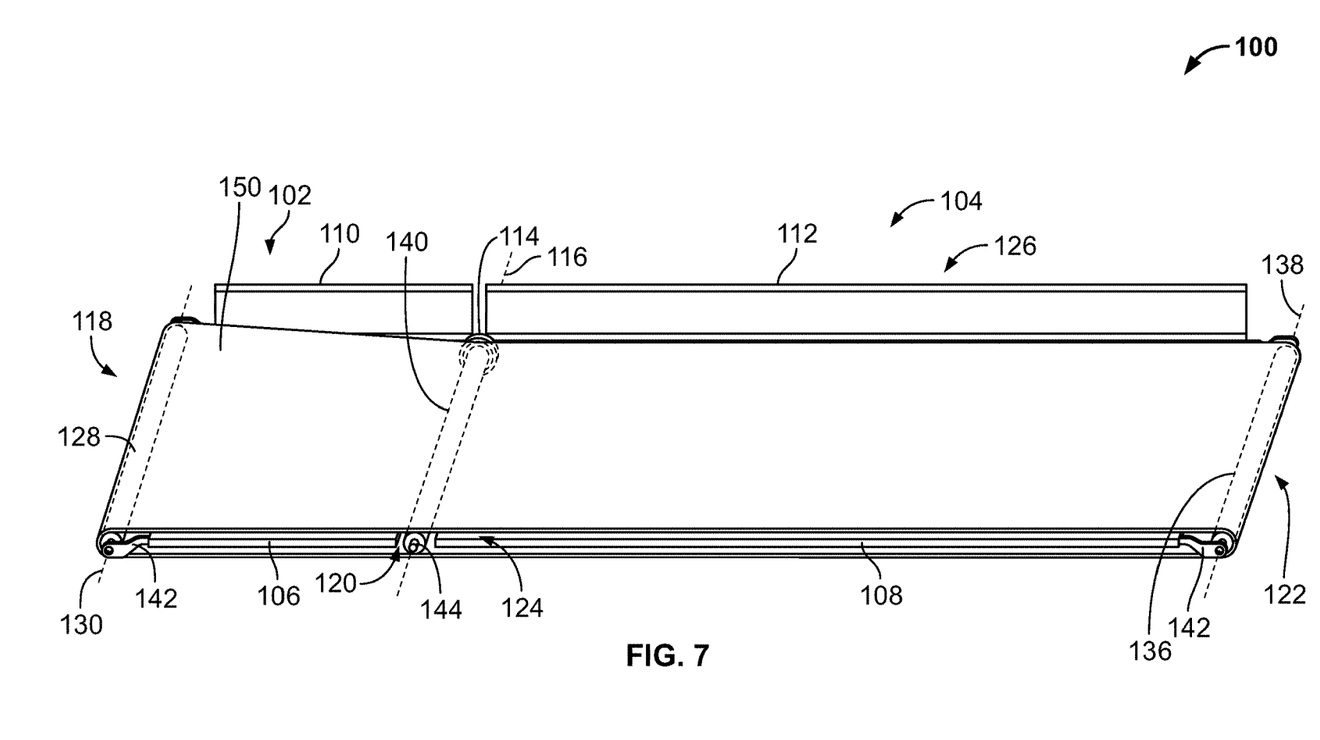
FIG. 7 is a perspective view of an exemplary draper belt system of the present disclosure including a central section, a left wing, and a draper belt.
Figure 8:
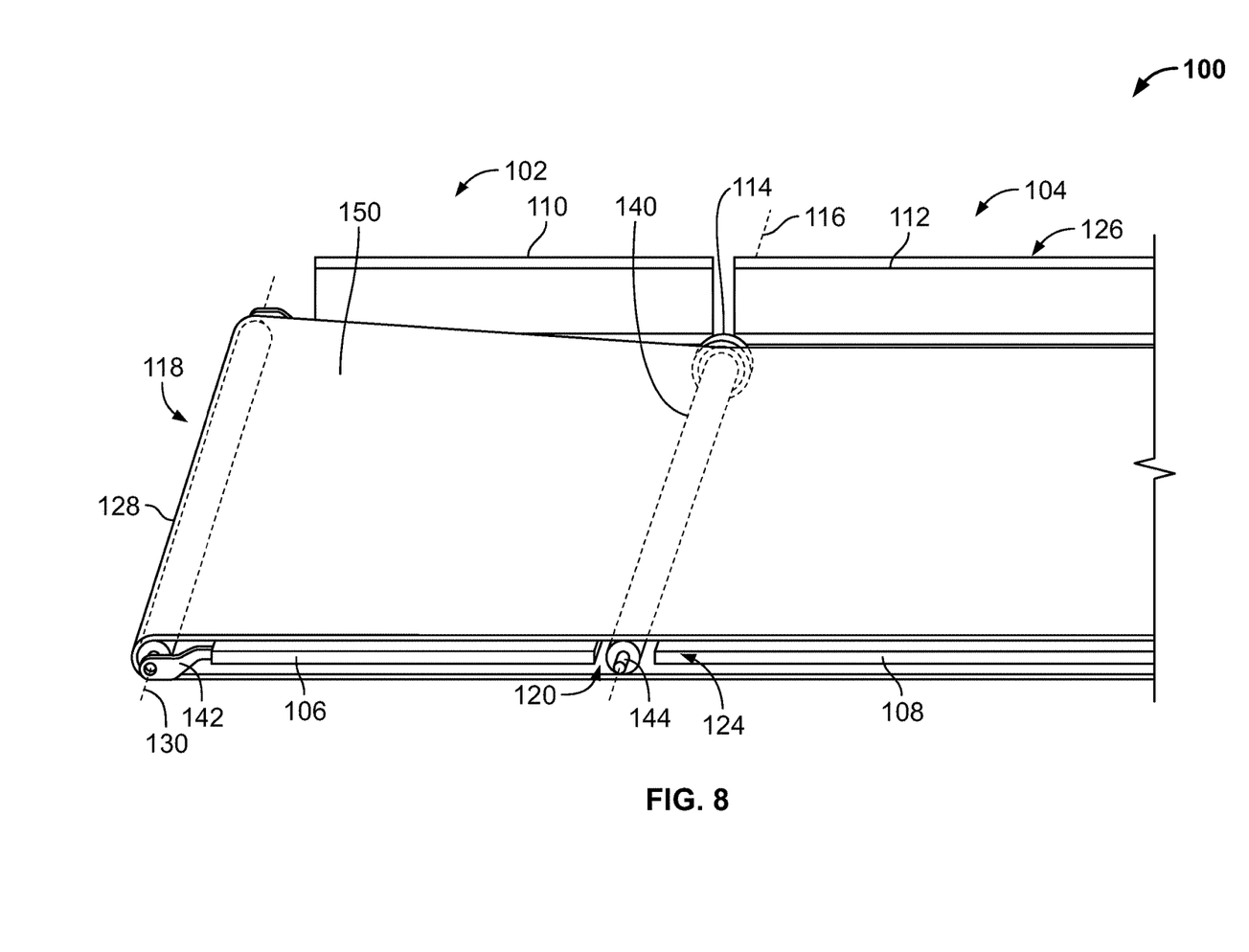
FIG. 8 is a detailed view of an exemplary draper belt system of the present disclosure including a central section, a left wing, and a draper belt.

FIGS. 7-9 show perspective, detailed and side views of the system 100. The draper belt assembly 126 includes a single draper belt 150 looped around the rollers 128, 140, 136. In particular, the draper belt 150 extends from the roller 128 to the roller 136, and passes over the central roller 140. The draper belt 150 therefore extends between the rollers 128, 136 without a gap in the draper belt 150 at the section of the draper frames 102, 104 where pivoting of the draper frame 104 occurs (e.g., at the pivot joint 114). Specifically, although a gap exists between the draper frames 102, 104 and the roller 140, the single draper belt 150 extends over and covers this gap. Without a gap in the draper belt 150 between the draper frames 102, 104, harvested crop can be transferred from the first end 122 of the draper frame 104 to the first end 118 of the draper frame 102 without loss of the harvested crop in-between.

Additionally, an upper run of the draper belt 150 is disposed over the central roller 140 and a lower run of the draper belt 150 is disposed under the central roller 140. The central longitudinal axis 116 for both the pivot joint 114 and the third roller 140 is, therefore, disposed between the upper and lower runs of the draper belt 150. By locating the central longitudinal axis 116 between the upper and lower runs of the draper belt 150, the amount of stretching and sagging of the draper belt 150 is minimized as the draper frame 102 pivots with respect to the draper frame 104. The location of the central longitudinal axis 116 between the upper and lower runs of the draper belt 150 also minimizes the amount of tension adjustment or flexing of the draper belt 150 needed when shortening or lengthening of the draper belt 150 occurs during pivoting of the draper frame 104. Additionally, by so locating the central longitudinal axis 116, contact between the belt 150 and the frame members 106, 108 is prevented when the draper frame 102 pivots with respect to the draper frame 104.

Figure 10:
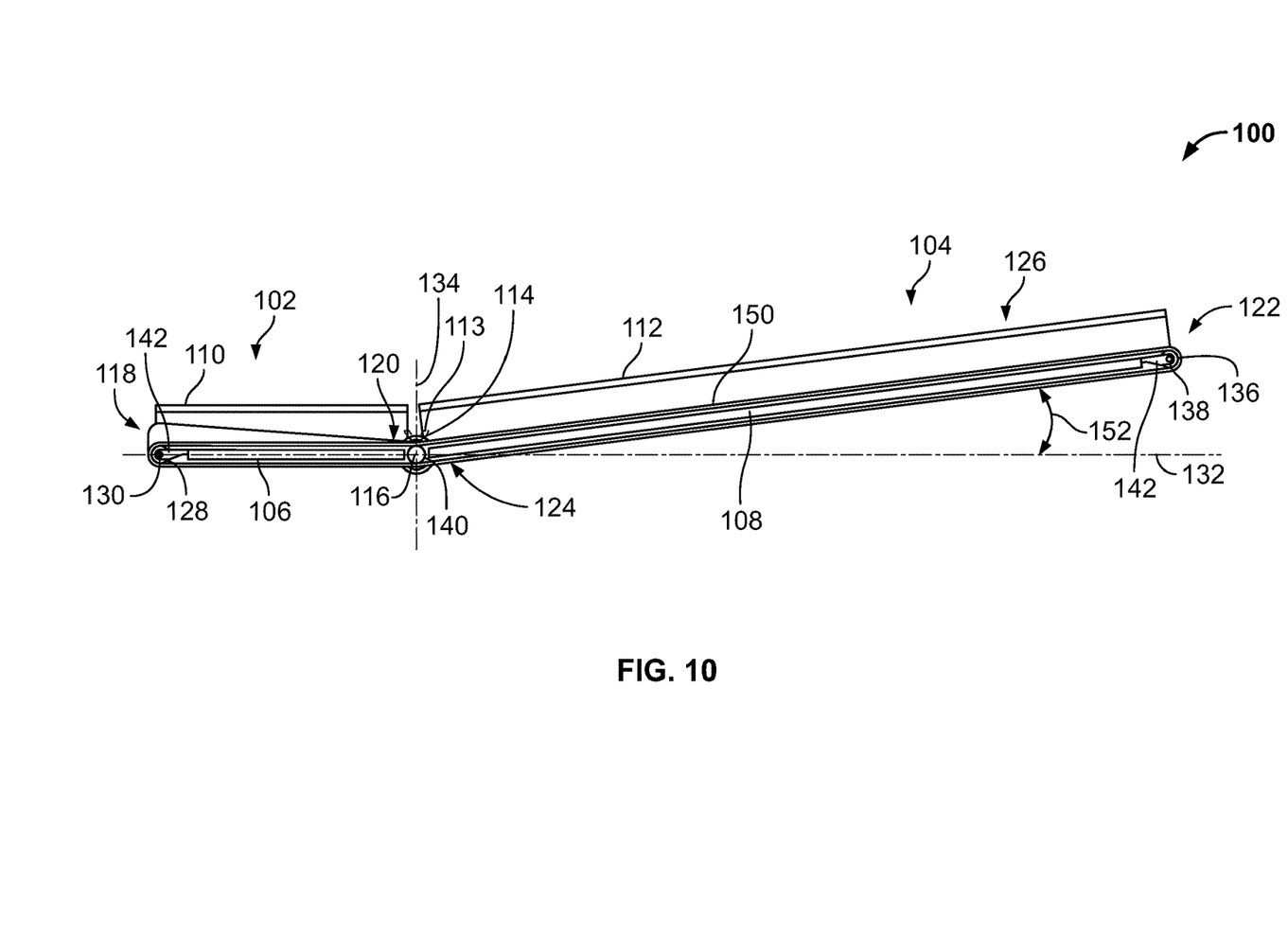
FIG. 10 is a front view of an exemplary draper belt system of the present disclosure including a left wing pivoted relative to a central section in an upward direction from horizontal.
Figure 11:
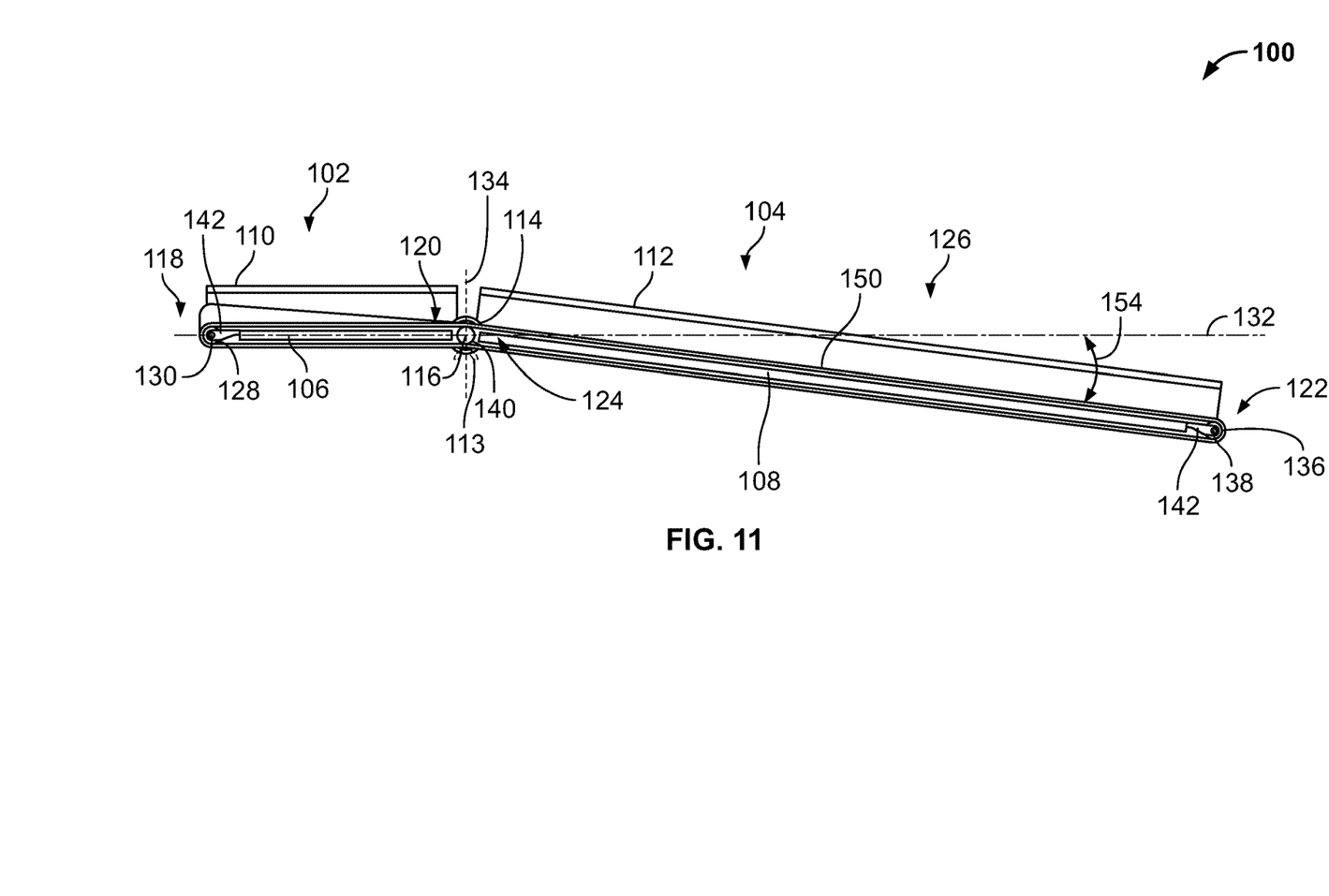
FIG. 11 is a front view of an exemplary draper belt system of the present disclosure including a left wing pivoted relative to a central section in an downward direction from horizontal.

As shown in FIG. 9, the draper belt assembly 126 and the draper frames 102, 104 extending along the same horizontal plane 132 that contains the central longitudinal axis 116. FIGS. 10 and 11 show the draper frame 104 pivoted upwardly and downwardly relative to the horizontal plane 132. In FIG. 10, the draper frame 104 is pivoted upwardly relative to the horizontal plane 132 by an angle 152. The system 100 can include one or more guides 113 (e.g., curved guides) disposed above the endpoints of the roller 140, thereby maintaining contact between the draper belt 150 and the roller 140 during upward pivoting of the draper frame 104. In particular, the guides 113 can prevent or limit lifting of the edges of the draper belt 150 from the roller 140 during upward pivoting of the draper frame 104. In some embodiments, the guide 113 can be mounted to a flange connected to the endpoint of the roller 140 and/or a flange connected to one of the frames 102, 104.

In FIG. 11, the draper frame 104 is pivoted downwardly relative to the horizontal plane 132 by an angle 154. The system 100 can include one or more guides 113 (e.g., curved guides) disposed below the endpoints of the roller 140, thereby maintaining contact between the draper belt 150 and the roller 140 during downward pivoting of the draper frame 104. In particular, the guides 113 can prevent or limit lifting of the edges of the draper belt 150 from the roller 140 during downward pivoting of the draper frame 104. In both orientations, the draper belt 150 extends over the roller 140 aligned with the pivot joint 114 between the draper frames 102, 104, thereby allowing the harvested crop to pass directly to the section associated with the draper frame 102. In some embodiments, the draper belt 150 can stretch to accommodate the pivoted orientation of the draper frame 104. In some embodiments, the tension of the draper belt 150 can be selected such that the draper frame 104 can be pivoted without excessive stretching of the draper belt 150.

While exemplary embodiments have been described herein, it is expressly noted that these embodiments should not be construed as limiting, but rather that additions and modifications to what is expressly described herein also are included within the scope of the present disclosure. Moreover, it is to be understood that the features of the various embodiments described herein are not mutually exclusive and can exist in various combinations and permutations, even if such combinations or permutations are not made express herein, without departing from the spirit and scope of the present disclosure.

The invention claimed is:

1. A draper belt system, comprising:
a first draper frame pivotally coupled to a second draper frame at a pivot joint, the pivot joint comprising a central longitudinal axis about which rotation at the pivot joint occurs; and
a draper belt assembly comprising a first roller rotatably coupled to the first draper frame, a second roller rotatably coupled to the second draper frame, and a third roller rotatably coupled between the first and second draper frames, the third roller comprising a central longitudinal axis about which the third roller rotates;
wherein the central longitudinal axis of the third roller is the same as the central longitudinal axis of the pivot joint; and
wherein the draper belt assembly comprises a single draper belt looped around the first, second and third rollers.

2. The draper belt system of claim 1, comprising a first guide disposed above the third roller and a second guide disposed below the third roller, the first and second guides limiting lifting of the single draper belt from the third roller during pivoting of the first draper frame relative to the second draper frame.

3. The draper belt system of claim 1, wherein the single draper belt extends between the first and second rollers without a gap in the single draper belt at the pivot joint.

4. The draper belt system of claim 1, wherein the central longitudinal axis of the third roller and the central longitudinal axis of the pivot joint are aligned along a plane extending through the central longitudinal axes and parallel or substantially parallel to horizontal.

5. The draper belt system of claim 1, wherein the central longitudinal axis of the third roller and the central longitudinal axis of the pivot joint are aligned along a plane extending through the central longitudinal axes and perpendicular or substantially perpendicular to horizontal.

6. The draper belt system of claim 1, wherein the first draper frame comprises a first end and an opposing second end.

7. The draper belt system of claim 6, wherein the first roller is rotatably coupled at or near the first end of the first draper frame.

8. The draper belt system of claim 6, wherein the second draper frame comprises a first end and an opposing second end.

9. The draper belt system of claim 8, wherein the second roller is rotatably coupled at or near the first end of the second draper frame.

10. The draper belt system of claim 8, wherein the third roller is rotatably coupled between the second ends of the first and second draper frames.

11. A harvester header, comprising:
a central draper frame;
a wing draper frame pivotally coupled to the central draper frame at a pivot joint, the pivot joint comprising a central longitudinal axis about which rotation at the pivot joint occurs; and
a draper belt assembly comprising a first roller rotatably coupled to the central draper frame, a second roller rotatably coupled to the wing draper frame, a third roller rotatably coupled between the central and wing draper frames, and a single draper belt looped around the first, second and third rollers;

wherein the third roller comprises a central longitudinal axis about which the third roller rotates; and wherein the central longitudinal axis of the third roller is the same as the central longitudinal axis of the pivot joint.

12. The harvester header of claim 11, wherein the single draper belt extends between the first and second rollers without a gap in the single draper belt at the pivot joint.

13. The harvester header of claim 11, wherein the central longitudinal axis of the third roller and the central longitudinal axis of the pivot joint are aligned along a plane extending through the central longitudinal axes and parallel or substantially parallel to horizontal.

14. The harvester header of claim 11, wherein the central longitudinal axis of the third roller and the central longitudinal axis of the pivot joint are aligned along a plane extending through the central longitudinal axes and perpendicular or substantially perpendicular to horizontal.

15. The harvester header of claim 11, wherein the first and second draper frames each comprise a first end and an opposing second end.

16. The harvester header of claim 15, wherein the first roller is rotatably coupled at or near the first end of the first draper frame, wherein the second roller is rotatably coupled at or near the first end of the second draper frame, and wherein the third roller is rotatably coupled between the second ends of the first and second draper frames.

17. A harvester, comprising:
a header comprising:
a first draper frame pivotally coupled to a second draper frame at a pivot joint, the pivot joint comprising a central longitudinal axis about which rotation at the pivot joint occurs; and a draper belt assembly comprising a first roller rotatably coupled to the first draper frame, a second roller rotatably coupled to the second draper frame, and a third roller rotatably coupled between the first and second draper frames, the third roller comprising a central longitudinal axis about which the third roller rotates;

wherein the central longitudinal axis of the third roller is the same as the central longitudinal axis of the pivot joint; and wherein the draper belt assembly comprises a single draper belt looped around the first, second and third rollers; and a processing system configured to process crop introduced into the processing system from the draper belt assembly.

18. The harvester of claim 17, wherein the single draper belt extends between the first and second rollers without a gap in the single draper belt at the pivot joint.

19. The harvester of claim 17, wherein the central longitudinal axis of the third roller and the central longitudinal axis of the pivot joint are aligned along a plane extending through the central longitudinal axes and parallel or substantially parallel to horizontal.

20. The harvester of claim 17, wherein the central longitudinal axis of the third roller and the central longitudinal axis of the pivot joint are aligned along a plane extending through the central longitudinal axes and perpendicular or substantially perpendicular to horizontal.

* * * * *